United States Patent [19]

Hill et al.

[11] 4,005,181

[45] * Jan. 25, 1977

[54] METHOD TO MAKE CARBON BLACK UTILIZING POLYMERS

[75] Inventors: George R. Hill, Houston, Tx.;
Homer M. Fox, Bartlesville, Okla.

[73] Assignee: Phillips Petroleum Company, Bartlesville, Okla.

[*] Notice: The portion of the term of this patent subsequent to Sept. 2, 1992, has been disclaimed.

[22] Filed: June 23, 1975

[21] Appl. No.: 589,509

Related U.S. Application Data

[60] Division of Ser. No. 324,393, Jan. 17, 1973, Pat. No. 3,903,249, which is a continuation-in-part of Ser. No. 841,567, July 14, 1969, abandoned.

[52] U.S. Cl. .................. 423/449; 423/450
[51] Int. Cl.² .................. C09C 1/48; C09C 1/50
[58] Field of Search .......... 423/449, 450, 455, 456, 423/457, 445; 23/259.5

[56] References Cited

UNITED STATES PATENTS

| | | | |
|---|---|---|---|
| 1,606,380 | 11/1926 | Pagenkoff | 423/449 |
| 2,564,700 | 8/1951 | Krejci | 423/456 |
| 2,796,332 | 6/1957 | Pollock | 423/450 |
| 3,073,681 | 1/1963 | Ceresna | 423/450 |
| 3,808,328 | 4/1974 | Kelly | 423/449 |
| 3,903,249 | 9/1975 | Hill et al. | 423/449 |

FOREIGN PATENTS OR APPLICATIONS 318,605  10/1969  U.S.S.R. ............ 423/449

Primary Examiner—Edward J. Meros

[57] ABSTRACT

Normally solid polymers can be fed into a carbon black furnace or carbon black reactor together with the fuel and/or the oxidant forming the hot combustion gases; the polymers are at least partially combusted in the carbon black reactor.

3 Claims, No Drawings

METHOD TO MAKE CARBON BLACK UTILIZING POLYMERS

This application is a division of our copending application Ser. No. 324,393, filed Jan. 17, 1973, now U.S. Pat. No. 3,903,249, which is a continuation-in-part application of the application Ser. No. 841,567, filed July 14, 1969, now abandoned.

The invention relates to the production of carbon black. More specifically the invention relates to the production of carbon black utilizing normally solid polymer materials.

BACKGROUND OF THE INVENTION

Carbon black, as is well known in the art, can be produced by introducing a feedstock and the hot gases produced by the combustion of fuel and oxidant into a reactor. Feedstock is pyrolytically decomposed into carbon black. Carbon black-containing smoke is recovered from the reactor, filtered, and the separated carbon black is utilized in various applications, particularly as an important ingredient in tires.

Plastic materials or normally solid polymers are increasingly used for various purposes. However, particularly when these plastic materials are not biodegradable, these materials constitute a problem for the waste disposal. It would therefore be desirable to have a process available by which normally solid polymers, e.g., scrap plastic from plastic factory, can be converted into a useful product.

THE INVENTION

It is therefore an object of this invention to provide a new carbon black process. Another object of this invention is to provide a new carbon black process in which normally solid polymers can be utilized.

A still further object of this invention is to provide a process wherein polymers selected from the group consisting of polyethylene, polypropylene, polyvinylchloride, polystyrene and mixtures thereof can be utilized to provide heat and/or a carbon black source.

Further objects, advantages, details, features, and embodiments of this invention will become apparent to those skilled in the art from the following detailed description of the invention and the appended claims.

In accordance with this invention normally solid polymers containing carbon atoms in their structure are introduced into a carbon black reactor or furnace together with fuel and/or the oxidant. The heat produced by the combustion of the fuel is sufficient to pyrolytically decompose liquid or gaseous hydrocarbon feedstock and to at least partially decompose and combust the polymer.

More specifically, this invention provides a carbon black process which comprises introducing a feedstock selected from the group of liquid and gaseous hydrocarbons into a carbon black reactor, combusting fuel and gaseous oxidant to produce hot combustion gases, having introduced a normally solid polymer selected from the group consisting of polyethylene, polypropylene, polyvinyl chloride and polystyrene, and mixtures thereof, into at least one of the reactants of the combustion step, contacting the hydrocarbon feedstock in the reactor with the hot combustion gases, pyrolytically decomposing said feedstock in the heat created by the combustion of the fuel and the oxidant such as to convert the feedstock into a carbon black-containing smoke, separating said carbon black from said smoke and recovering said carbon black.

As used herein, the term "oxidant" means a gaseous oxidant selected from the group of oxygen, oxygen-enriched air, and air. Presently air is the preferred oxidant for the combustion of the fuel.

The process of this invention can be carried out in the equipment and under the operating conditions conventionally employed to produce carbon black. Generally, the polymer will be included in the fuel stream and/or the oxidant stream being introduced into a carbon black reactor of such types as are described in U.S. Pat. Nos. 2,564,700, 2,616,794 and 3,355,247, the disclosures of which patents are hereby included in this application by reference.

The feedstocks employed in the process of this invention can be any of the usually employed liquid or gaseous hydrocarbon feedstocks. The kind of feedstock employed is primarily defined by the properties of the carbon black wanted. As a general rule, the higher the aromaticity of the feedstock, the higher the structure of the carbon black produced. However, for the purposes of this invention, any usually employed carbon black feedstock can be used. Examples for liquid hydrocarbon feedstocks are aromatic extract oils, particularly $SO_2$ extract oils, having initial boiling points in the range of about 300° to 350° C and end points of about 500° to about 600° C, light and heavy cycle oils, benzene, toluene, xylenes, liquid paraffins, paraffinic raffinate, heating distillates, straight run or virgin gas oils, kerosene, etc. The examples for normal gaseous feedstocks are propane and butane. Presently preferred feedstocks are aromatic oils, particularly those having a BMCI in the range of 90 to 140. It is also within the scope of this invention to incorporate polymers from the group defined above also in the feedstock so that these polymers are converted at least partially into carbon black. The inclusion of these polymers into feedstocks is described in more detail in our copending application Ser. No. 324,393, mentioned above, which is hereby incorporated by reference.

The fuels normally employed in the carbon black art can be used in accordance with this invention. Examples of such fuels are vapors or gaseous fuels such as natural gas, methane, ethane, liquefied petroleum gas, e.g., propane and/or n-butane, as well as mixtures of such gaseous fuels; liquid fuels of the paraffinic type or the aromatic type. Examples for liquid fuels of the paraffinic type are kerosene with an initial boiling point of about 150° C and an end point of about 270° to 275° C (this type of fuel is mainly paraffinic but can contain naphthenics and aromatics to some degree, depending upon the source of crude oil from which it is derived), heating distillates with an initial boiling point of about 150° C and an end point of about 300° C, straight run or virgin gas oils with an initial boiling point of about 300° C, and an end point of about 500° to 600° C, paraffinic raffinate from conventional solvent extraction, e.g., from liquid $SO_2$ or phenol extraction, of a cracked stock such as the well-known light cycle oils, heavy cycle oils and decant oils recovered from catalytic cracking of virgin gas oils, reduced crudes, topped crude oils and the like; the initial boiling points of these paraffinic raffinates being about 300° to 350° C, and the end points being about 500° to about 600° C. Examples for liquid fuels of the aromatic type are benzene, toluene, xylenes, aromatic extract oils, e.g., those from liquid $SO_2$ or phenol extraction of various feedstocks, which aromatic extract oils have initial boiling points of about 300° to 350° C and end points of about 500° to about 600° C, light cycle oils, heavy cycle oils, decant oils, and the like.

The incorporation of the polymers in the fuel and/or the oxidant in accordance with this invention can be done in various ways. Generally speaking, the polymers can be either dissolved in a liquid fuel or dispersed, suspended or entrained in liquid fuel, or dispersed, suspended or entrained in a gaseous or vaporous fuel in the gaseous oxidant. It is also within the scope of this invention to introduce the polymer both suspended or dissolved in the fuel and suspended in the gaseous oxidant.

More specifically, the polymers used, which are polypropylene, polyvinyl chloride, polystyrene, polyethylene, and mixtures thereof, can be dissolved in preferably preheated liquid fuels. Thus, up to about 10 weight percent of the polymers mentioned can be introduced into the carbon black reactor, dissolved in a paraffinic liquid fuel heated to about 120° to about 140° C. Wherein an aromatic liquid fuel is employed up to about 40 weight percent of the polymers mentioned can be introduced into the reactor dissolved in said aromatic liquid fuel which is preheated to about 120° to about 140° C.

When in accordance with another embodiment of this invention the polymer is suspended or entrained in a liquid fuel, up to about 15 parts by weight of the polymer can be included in 100 parts by weight of the liquid fuel. Preferably the polymer is added to the liquid fuel in a particle size distribution which is such that the polymer passes through a 200 mesh U. S. Sieve or even a sieve with a higher mesh number, e.g., up to 400 mesh. The numerical values given above are not absolute values but constitute preferred ranges in order to prevent or minimize deposition of the polymer or coking in the combustion zone of the carbon black reactor.

In the further embodiment of this invention wherein the polymer is added either to the gaseous or vaporous fuel or to the gaseous oxidant, the following features are preferred: The polymer is added to the gaseous fuel or the gaseous oxidant in a quantity of up to 20 parts by weight per 100 parts by weight of either the fuel or the gaseous oxidant. The quantity employed depends upon fluid velocity from a particle size, density, etc. The size of the particles of a plastic material introduced into either the gaseous fuel or the gaseous oxidant preferably is such that the particles pass through a 200 mesh U. S. Sieve or even a finer sieve with a larger mesh number.

For an efficient disposal of the polymers it is presently preferred to introduce at least about 0.5 parts by weight of polymer into 100 parts by weight of fuel or oxidant. This preferred lower limit applies both to the embodiment in which the polymer is dissolved in the fuel stream and to embodiments in which the polymer is suspended in at least one combustion reactant.

It is preferred to introduce the fuel and the gaseous oxidant as separate streams containing the polymer into the carbon black reactor and to combust the fuel in the reactor. Thus, conduits for the hot combustion gases are avoided. It is, however, also possible to combust the fuel and the oxidant outside of the reactor and to feed the hot combustion gases into the reactor. In both embodiments the polymer is in intimate contact with the hot combustion gases.

The invention will be still more fully understood from the following calculated example.

EXAMPLE

Into an O-type reactor, such as pictured in U.S. Pat. No. 2,564,700, having an enlarged precombustion zone and a reaction zone having a smaller diameter than the precombustion zone and having an axial hydrocarbon feed and a tangential hot combustion gas feed into the precombustion chamber, the ingredients in quantities as indicated in the following table are introduced:

| | | |
|---|---|---|
| Tangential Air[1] | | |
| SCF/hr | 150,000 | |
| SCM/hr | | 4,275 |
| Tangential Natural Gas[2] | | |
| SCF/hr | 9,000 | |
| SCM/hr | | 255 |
| Polymer in Natural Gas (Entrained) | | |
| Pounds/SCF | 0.0042 | |
| Kg/SCM | | 0.32 |
| Tangential Tunnel Exit Velocity | | |
| Ft/sec | 250 | |
| Meters/sec | | 76 |
| Make Oil[3] (SO₂ Extract Oil, 100 BMCI, ave. mol wt. 300) | | |
| Gallons/hr | 200 | |
| Cubic meters/hr | | 0.76 |
| Axial Air | | |
| SCF/hr | 4,000 | |
| SCM/hr | | 114 |
| Carbon Black Product | | |
| Pounds/hr | 800 | |
| Kg/hr | | 1,760 |
| N₂SA, m²/gm | 85 | 85 |
| DBP, cc/100 gm | 95 | 95 |
| Photelometer | 90 | 90 |

SCF = standard cubic ft - 1 atm., 60° F.
SCM = standard cubic meters - 1 atm., 15° C.
[1]Preheated to 200° C.
[2]1000 btu/SCR or 35.8 kilogoules/SCM.
[3]Preheated to 130° C.

The carbon black properties are estimated properties. These estimations are based on the experience with the particular hydrocarbon feed and the particular reactor involved.

Reasonable variations and modifications which would be apparent to those skilled in the art can be made in this invention without departing from the spirit and scope thereof.

We claim:

1. A process for producing carbon black by the pyrolytic decomposition of hydrocarbon feedstock comprising:
   a. introducing a hydrocarbon feedstock selected from the group of liquid and gaseous hydrocarbons into a carbon black reactor;
   b. combusting a normally liquid fuel having dissolved therein a normally solid polymer selected from the group consisting of polyethylene, polypropylene, polyvinyl chloride and polystyrene and mixtures thereof with a gaseous oxidant selected from the group consisting of air, oxygen-enriched air, and oxygen to produce hot combustion gases,
   c. contacting the hydrocarbon feedstock in the carbon black reactor with the hot combustion gases;
   d. pyrolytically decomposing said feedstock in the heat created by the combustion of step (b), such as to convert said feedstock into a carbon black-containing smoke;
   e. separating said carbon black from said smoke; and
   f. recovering said carbon black.

2. A process in accordance with claim 1 wherein said normally liquid fuel is a paraffin fuel and is preheated to about 120° to 140° C, up to about 10 wt. % of said polymer is dissolved in said preheated fuel to form a preheated solution, and said preheated solution is combusted with said oxidant to form said hot combustion gases.

3. A process in accordance with claim 1 wherein said normally liquid fuel is an aromatic fuel and is preheated to about 120° to 140° C, up to 40 wt. % of said polymer is dissolved in said aromatic liquid fuel to form a preheated solution and said preheated solution is combusted with said oxidant to form said hot combustion gases.

* * * * *